(No Model.) 2 Sheets—Sheet 1.

S. E. LORING.
BRICK OR TILE AND MOLD FOR ITS MANUFACTURE.

No. 261,364. Patented July 18, 1882.

Witnesses.
H. E. Lodge
H. Curtis

Inventor.
Sanford E. Loring (No Model.) 2 Sheets—Sheet 2.

S. E. LORING.
BRICK OR TILE AND MOLD FOR ITS MANUFACTURE.

No. 261,364. Patented July 18, 1882.

ellipse.

octagon.

hexagon.

Witnesses.
H. E. Lodge
F. Curtis.

Inventor.
Sanford E. Loring

UNITED STATES PATENT OFFICE.

SANFORD E. LORING, OF CASTLETON, VERMONT.

BRICK OR TILE AND MOLD FOR ITS MANUFACTURE.

SPECIFICATION forming part of Letters Patent No. 261,364, dated July 18, 1882.

Application filed October 29, 1881. (No model.)

*To all whom it may concern:*

Be it known that I, SANFORD E. LORING, a citizen of the United States, residing at Castleton, in the county of Rutland and State of Vermont, have invented certain new and useful Improvements in Bricks or Tiles and Molds for their Manufacture; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The purpose of this invention is to provide a brick or tile which, while possessing the ordinary thickness at its margin or edges, shall be reduced in thickness by means of a depression in one side, which shall be of such extent as to materially lessen its weight, this depression serving also to accelerate and enhance the burning or baking of said tiles or bricks.

My invention is applicable generally to tiles or bricks composed of a spongeous, penetrable character shown in Letters Patent of the United States issued to myself on the 27th day of October, 1874, or to the ordinary clay brick of commerce.

Figure 1:
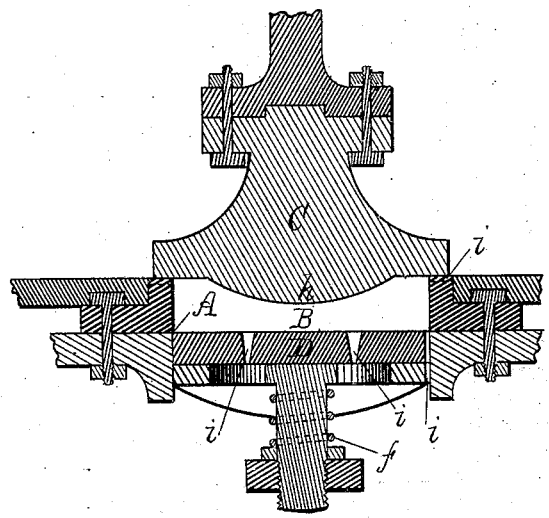
Figure 2:
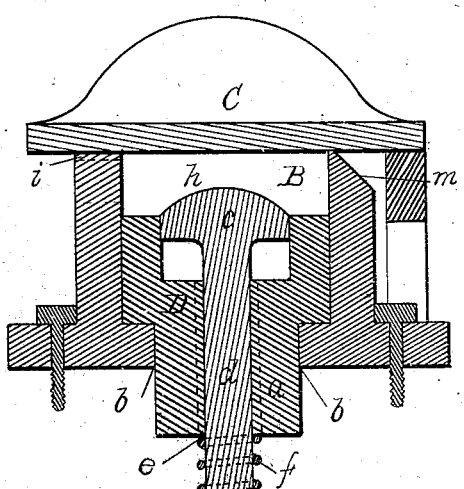
Figure 3:
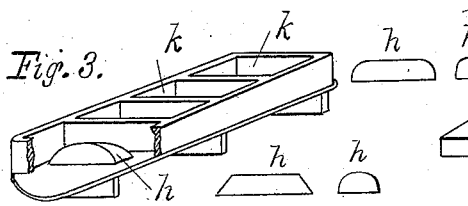
Figure 10:
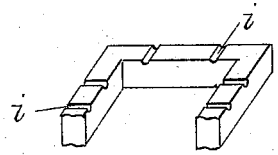
Figure 11:
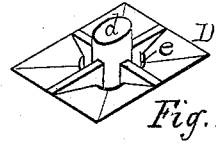
Figure 12:
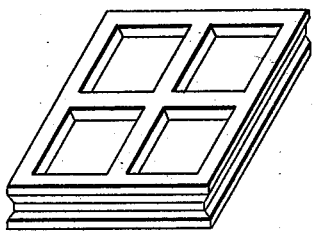
Figure 13:
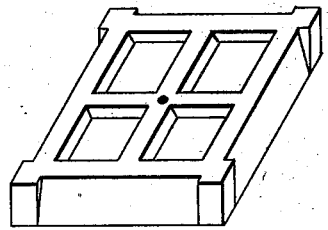
Figure 14:
Figure 15:
Figure 16:
Figure 17:
Figure 18:
Figure 19:
Figure 20:
Figure 21:
Figure 22:
Figure 23:
Figure 24:

The drawings accompanying this specification represent in Figures 1 and 2 sections of molds for producing my bricks or tiles; Fig. 3, a view of an ordinary brick-mold provided with means for carrying out my improvement. Figs. 4, 5, 6, 7, and 8 represent top perspective views of different forms of bricks or tiles made according to my invention. Fig. 9 represents a bottom perspective view of another form of brick or tile made according to my invention. Fig. 10 represents in detail a part of a mold for forming the same containing grooves $i$. Fig. 11 represents in detail perspective the former of a mold, which is adapted to make the depression shown in Fig. 9. Figs. 12 and 13 represent perspective views of large tiles having several depressions. Figs. 14, 15, 16, 17, 18, 19, 20, 21, 22, 23, and 24 are vertical sections taken through different forms of tiles or bricks made according to my invention.

Figure 4:
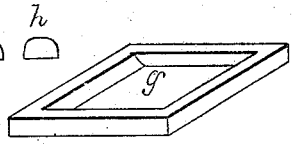
Figure 5:
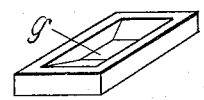

In manufacturing my tiles or bricks, which require considerable pressure, any ordinary brick-press may be employed, and molds and plunger of the requisite size and form are to be added thereto. For instance, in Fig. 2 of the drawings I have shown a mold which is to be applied to a brick-press, and in which the molding-chamber is shown at B as open at top and closed by a cap or head, C, the inner face of which constitutes an abutment to form the bottom or flat face of the brick or tile. The plunger in this case is a compound one—that is, the lower part of the chamber B is occupied by a tubular block, D, the stem $a$ of which extends downward through an opening, $b$, in the bottom of the chamber, while the upper end of such block is recessed to receive the head of a plunger, $c$, the shank $d$ of which extends downward through the bore $e$ of said block, and is enveloped below the latter by a coiled spring, $f$, which exerts its stress against the under side of said block to crowd the latter upward. The upper part of the block D presses the margin of the under side of the brick or tile, while the upper part or swell, $h$, of the plunger $c$ effects the depression $g$ in the center of said brick or tile, as shown in Figs. 4 and 5 of the drawings. Consequently the configuration of the top of the plunger is to be of the form to be imparted to such depression.

The form of the mold B and plunger-block D in cross-section is to be such as is desired to produce any given brick or tile, whether square, as shown in Fig. 4 of the drawings, or oblong, as shown in Fig. 5, or such other shapes as taste or circumstances may dictate.

The bricks or tiles, especially tiles, which I propose to manufacture under this method may be produced in great variety as regards ornamental forms and configurations, and in addition to the lightness imparted to them by the depression $g$ may be made a subject of ornament, as shown in Figs. 6, 7, 8, and 9.

In Fig. 1 of the drawings the parts of the mold are transposed—that is, the swell $h$, which effects the depression in the tile, is shown as formed upon the under side of the cap or head C of the mold, while the upper surface of the pressure-block D is flat and fills the mold.

It is important or desirable when manufacturing tiles in the manner shown that the thickness of such tiles shall be uniform. Hence the block D is formed to bring up solidly against the bottom of the chamber B, while the bottom of the cap or head C bears with equal firmness upon the top of the walls of the chamber B. For this reason it is important that some means of escape for the surplus or excess of material be provided. As one means of permitting of this I propose to employ channels or passages $i\ i$, &c., leading from the molding-chamber. These passages may be located at any convenient point. They may be in the upper edges of the mold-box, as shown in Figs. 1, 2, and 10, or on the edges of the pressure-block or plunger, as shown in Figs. 1 and 8, or may be formed vertically through the latter, as shown in said Fig. 1.

I also propose in some instances to reduce the upper edges of the walls of the chamber B to a knife-edge, as shown at $m$ in Fig. 2 of the drawings, and create passages through the adjacent parts of the mold to permit of escape of excess of material passing through such knife-edge. This sharp edge serves to prevent accumulation of material between the walls of the chamber B and the under side of the cap C.

I also propose for some uses to form vertical grooves $n\ n$, &c., in the edges of the brick or tile, as shown in Figs. 8 and 9 of the drawings, and to effect these splines or ribs are to be formed upon the inner walls of the molding-chamber B. These grooves permit of passage of heat when the bricks are being burned in a kiln, thereby obtaining a more uniform and perfect baking of such brick and in less time than heretofore.

In Fig. 3 of the accompanying drawings I have shown a hand brick-mold for producing the ordinary clay brick, this mold being of the usual construction, except that I add to the bottom of each of its cells or pockets $k$ a raised projection or swell of form of the depression to be made in the brick. As the clay is molded the projection $h$ effects the depression in the bottom of the brick, and this remains while the brick is being baked.

Figure 6:
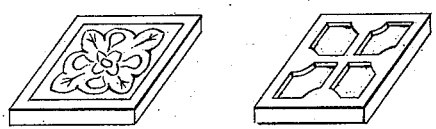

A tile having an ornamental depression, as shown in Fig. 6 of the drawings, will be found very desirable for the ceilings, and, in some instances, walls of apartments, in the walls and mantels, panels of fire-places, and in other localities, and, in lieu of adding to the expense of a tile, will reduce it, as it requires less material.

As a small portion of the material of the tiles or bricks might be forced into the recess in the upper part of the block D before the plunger $c$ rises, and thereby prevent ascent of such plunger, I form in the bore $e$ of the said block longitudinal grooves or passages to permit of escape of such small amount of material as might find its way into said recess.

I also propose in some instances to connect a steam-pipe with the interior of the chamber B to lubricate the parts and permit of ready removal of the tile.

In Figs. 13 to 20, inclusive, of the drawings I have shown various forms of tiles of which my invention is susceptible.

Figure 7:
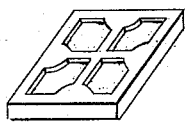
Figures 8, 9:
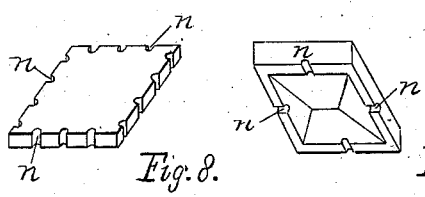

In large tiles it is advisable to make a series of depressions separated by ridges running across the middle part of the tile, as shown in Figs. 7, 8, and 9 of the drawings.

I claim—

1. A mold-box having a beveled cutting-edge, $m$, and pockets or outlets, substantially as set forth.

2. A mold-box having a beveled cutting-edge, $m$, grooves $i$, and adjacent pockets or outlets, substantially as set forth.

3. A brick or tile having one side even and the other side constructed with a depression or depressions, surrounded by a rim at all parts of the edge thereof, and with its edges rabbeted, beveled, channeled, notched, or otherwise formed for the purpose of receiving mortar or cement to effect a more perfect joint.

4. A brick or tile having one side even and the other side constructed with a depression or depressions, surrounded by a rim at all parts of the edge thereof, and provided with a depression and an orifice approximately near the center for the purpose of receiving a bolt or screw and washer to secure said tile.

In testimony whereof I affix my signature in presence of two witnesses.

SANFORD E. LORING.

Witnesses:
H. E. LODGE,
F. CURTIS.